(12) United States Patent
Harcup

(10) Patent No.: US 8,245,970 B2
(45) Date of Patent: Aug. 21, 2012

(54) ARRAY OF AIRCRAFT SEATS

(75) Inventor: Anthony Harcup, London (GB)

(73) Assignee: American Airlines, Inc., Fort Worth, TX (US)

( * ) Notice: Subject to any disclaimer, the term of this patent is extended or adjusted under 35 U.S.C. 154(b) by 401 days.

(21) Appl. No.: 12/462,905

(22) Filed: Aug. 11, 2009

(65) Prior Publication Data

US 2010/0038485 A1 Feb. 18, 2010

Related U.S. Application Data

(60) Provisional application No. 61/188,568, filed on Aug. 11, 2008.

(51) Int. Cl.
*B64D 13/00* (2006.01)

(52) U.S. Cl. .................................. 244/118.6; 244/118.5

(58) Field of Classification Search ............... 244/118.5, 244/118.6, 122 R, 117 R; 297/1, 118, 232, 297/245, 354.13; 5/9.1, 10.1
See application file for complete search history.

(56) References Cited

U.S. PATENT DOCUMENTS

| | | | |
|---|---|---|---|
| D439,063 S * | 3/2001 | Round et al. | D6/356 |
| 6,209,956 B1 * | 4/2001 | Dryburgh et al. | 297/245 |
| 7,025,306 B2 * | 4/2006 | Saint Jalmes | 244/118.6 |
| 7,320,446 B2 * | 1/2008 | Saint-Jalmes et al. | 244/118.6 |
| 2003/0085597 A1 | 5/2003 | Ludeke et al. | |
| 2005/0189804 A1 * | 9/2005 | Mercier | 297/232 |

FOREIGN PATENT DOCUMENTS

| | | | |
|---|---|---|---|
| DE | 102006056898 A1 * | 6/2008 | |
| WO | 2004 083035 | 9/2004 | |
| WO | 2007 024776 | 3/2007 | |

* cited by examiner

*Primary Examiner* — Tien Dinh
*Assistant Examiner* — Jamie S Stehle
(74) *Attorney, Agent, or Firm* — Bay State IP, LLC

(57) ABSTRACT

Sleeper seats, wherein each comprises a head rest, a back rest, a seat pan or seat cushion, a leg rest, an ottoman and a divider between the individual seats with the their column. The four seats are arranged in a staggered chevron formation and two columns. All the seats in each column are parallel with each other and set at a "herringbone" angle α to the column direction, in other words their central axes make the angle α with a longitudinal axis of the array. Each seat extends from its column side of the longitudinal axis across the axis to a small extent. Along the axis, first a seat from one column crosses the axis and then a seat from the other column crosses the axis and so on.

14 Claims, 4 Drawing Sheets

ARRAY OF AIRCRAFT SEATS

CROSS REFERENCE TO RELATED APPLICATION

This application takes priority from and claims the benefit of Provisional Application Ser. No. 61/188,568 filed on Aug. 11, 2008 the contents of which are hereby incorporated by reference.

BACKGROUND OF THE INVENTION

1. Field of the Invention

The present invention relates to an array of aircraft seats.

2. Description of the Related Art

Aircraft passenger seats are arrayed in an aircraft cabin in accordance with a Layout of Passenger Accommodation, known in the art as a LOPA. A LOPA generally refers to the layout for an entire aircraft and includes not only seating, but also galleys and lavatories. The present invention relates to an array primarily, but not exclusively, for sleeper seats; that is seats that are convertible from sitting mode to sleeping mode. Such seats usually comprise a proportion only of the total seating in a cabin. Accordingly in this specification, the term "array of aircraft seats" of aircraft seats is used to denote arrangement of a proportion, or indeed possibly the totality, the seats in an overall LOPA.

In design of a LOPA, a major consideration is efficient utilisation of the cabin that is maximising the number of seats or at least maximising revenue from the seats, bearing in mind that sleeper seats command a substantial premium with respect to economy seats.

SUMMARY OF THE INVENTION

The object of the present invention is to provide an improved array of aircraft seats According to the invention there is provided an array of aircraft seats comprising:

two columns of seats arranged for array along an aircraft cabin on respective sides of a longitudinal axis of the array;

the seats having respective central axes, the seats in each column having their central axes angled with respect to the longitudinal axis, the seats in one column being offset along the longitudinal axis with respect to the corresponding seats in the other column, whereby the intersections with the longitudinal axis of the central axes of the seats of one column are interdigitated with the intersections with the longitudinal axis of the central axes of the seats of the other column and minor, overlapping, inner-end portions of any two seats arranged for-and-aft of each other in one column extending across the longitudinal axis from their major portions at their intersections and an intervening seat in the other column having a minor, overlapping, inner-end portion extending oppositely across the longitudinal axis from its major portion at its intersection;

dividers between the seats within the columns; and a serpentine divider comprised of successive longitudinal axis portions of the dividers between the seats, the serpentine divider extending generally along the longitudinal axis between the seats of the two columns, following the extent of the minor overlapping portions across the longitudinal axis.

According to the invention there is provided an array of aircraft seats comprising:

two columns of seats arranged for array along an aircraft cabin on respective sides of a longitudinal axis of the array;

the seats having respective central axes, the seats in each column having their central axes angled with respect to the longitudinal axis, the seats in one column being offset along the longitudinal axis with respect to the corresponding seats in the other column, whereby the intersections with the longitudinal axis of the central axes of the seats of one column are interdigitated with the intersections with the longitudinal axis of the central axes of the seats of the other column and minor, overlapping, inner-end portions of any two seats arranged for-and-aft of each other in one column extending across the longitudinal axis from their major portions at their intersections and an intervening seat in the other column having a minor, overlapping, inner-end portion extending oppositely across the longitudinal axis from its major portion at its intersection; and a serpentine divider extending generally along the longitudinal axis between the seats of the two columns, following the extent of the minor overlapping portions across the longitudinal axis.

Preferably, the seats are sleeper seats.

Whilst non-symmetrical arrangements can be envisaged, in the preferred embodiments, the minor, overlapping, inner-end portions of the two columns overlap the longitudinal axis by equal extents.

Preferably, the extent of the overlap of the minor, overlapping, inner-end portions is between 3% and 6% of the overall width of the array.

Again in the preferred embodiments, all the seats are arranged with their central axes at substantially the same angle with respect to the longitudinal axis.

In one preferred embodiment, the seats are arranged in a staggered chevron array, that is with the seats in one column angled with respect to the seats in the other column, and with the central axes of all the seats in one column making with the longitudinal axis substantially the same angle measured in the clockwise (or anti-clockwise) direction as the central axes of all the seats in the other column make with the longitudinal axis measured in the anti-clockwise (or clockwise) direction.

In a staggered chevron array, the seats all face in the same direction with respect to the column axis, and preferably outwards of the array, that is with their portions extending across the axis being at the head ends of the seats. Preferably, the array is arranged so that the seats are forwards and outwards facing in the aircraft cabin.

In another embodiment, known as the "parallel array", the seats in one column face in one direction and the seats in the other column face in the other direction and again all preferably outwards. Whilst each seat in one column could be aligned with an oppositely facing seat in the other column, they are preferably offset from each other.

Preferably, the array includes on opposite sides of aisles outboard of the two columns of seats, two side columns of angled seats are set against cabin side walls, one side column on one side of the two column array along the longitudinal axis and the other on the other side. Normally these seats will be both outwards and forwards facing.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE PREFERRED EMBODIMENT

Figure 1:
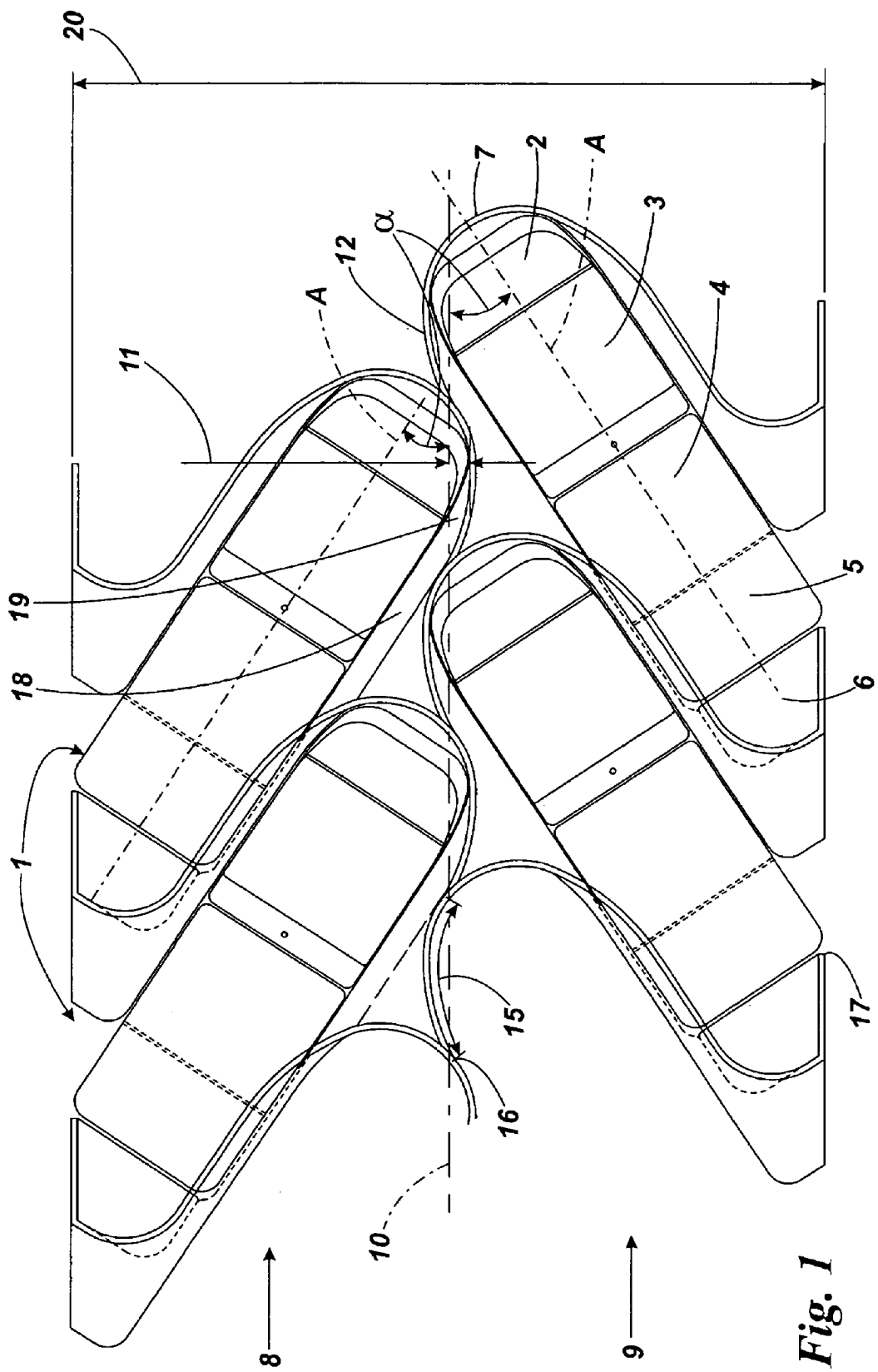
FIG. 1 is a plan view of a short array of four sleepers seats arrayed in first embodiment in accordance with the invention.
Figure 2:
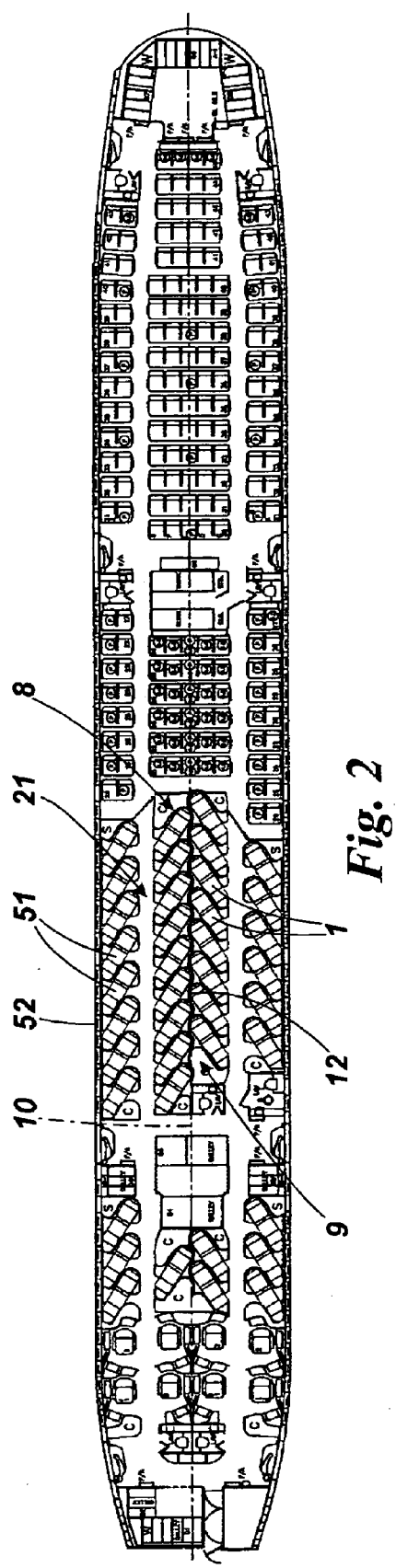
FIG. 2 is a LOPA view of the seats of FIG. 1 in an aircraft cabin.

Referring to FIGS. 1 & 2, the sleeper seats 1 are shown there in sleeping mode. Each comprises a head rest 2, a back rest 3, a seat pan or seat cushion 4 and a leg rest 5, all of which move in a conventional manner when the seat is moved from sleeping mode to sitting mode. The seats also include ottomans 6 and dividers 7 between the individual seats with the their column. The four seats shown in FIG. 1 are arranged in a staggered chevron formation and two columns 8, 9. All the seats in each column are parallel with each other and set at a "herringbone" angle α to the column direction, in other words their central axes A make the angle α with a longitudinal axis 10 of the array. The seats being arranged in the staggered chevron array, the seats in one column are angled with respect to the seats in the other column, and the central axes of all the seats in one column make with the longitudinal axis substantially the same angle measured in the clockwise (or anti-clockwise) direction as the central axes of all the seats in the other column make with the longitudinal axis measured in the anti-clockwise (or clockwise) direction.

Each seat extends from its column side of the longitudinal axis across the axis to a small extent 11. Along the axis, first a seat from one column crosses the axis and then a seat from the other column crosses the axis and so on. The seats on opposite sides of the axis are screened from each other by a serpentine divider 12, which passes from one side of the axis 10 to the other side along the longitudinal axis. At joints 15, just on an individual seat's side of the longitudinal axis, the serpentine divider forks from the seat's own divider 7 from the next seat in the respective column. In effect the serpentine divider is comprised of successive longitudinal axis portions 15 of the dividers 7, which are made as a continuous piece from their inboard ends 16 to their outboard ends 17.

In addition to the seats extending to the small extent 11 across the longitudinal axis, bed side areas 18 at end 19 also extend across the axis.

Typically for a herringbone angle α of 34° and an array width 20 of 93.5 inches (2375 mm), the extent of the overlap is 3.3 inches (84 mm) in the widthwise direction, i.e. 3.5% of the array width. In another example (not illustrated) for an array of 85.4 inches (2169 mm) and a herringbone angle of 30° the overlap is also 3.9 inches (99 mm), i.e. 4.6% of the array width.

As shown in FIG. 2, which is a three class/fare LOPA, the seats 1 arrayed in accordance with the invention are installed in a business class section 21 of the cabin. Similar, single column, herringbone arrayed seats 51 are provided along the side wall 52 of the cabin.

Figure 3:
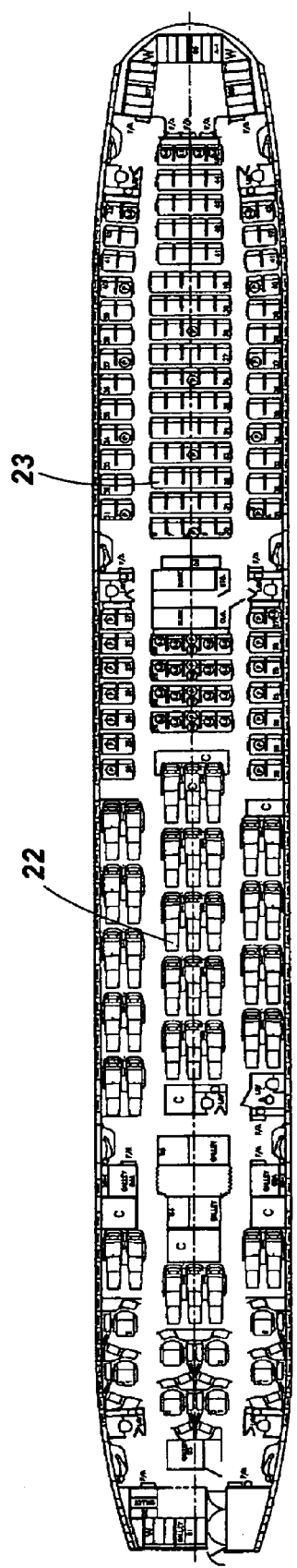
FIG. 3 is an equivalent LOPA to that of FIG. 2 showing a cabin equipped with conventional seats.

It can be noted that array of FIG. 1 has advantages, which can be appreciated from FIG. 2 by comparison with FIG. 3, which shows an equivalent business class passenger count LOPA, it is necessary to utilise conventional business class seats 22 arrayed three abreast along the centre of the cabin. This requires central passengers to step over their neighbours for aisle access, as is required window seat passengers seated against the side wall of the cabin. By contrast, the seats 1 arrayed in accordance with the invention all have direct aisle access. Further, it will be noted that the array in accordance with the invention allows an increase by sixteen in the number of economy class seats 23.

Figure 4:
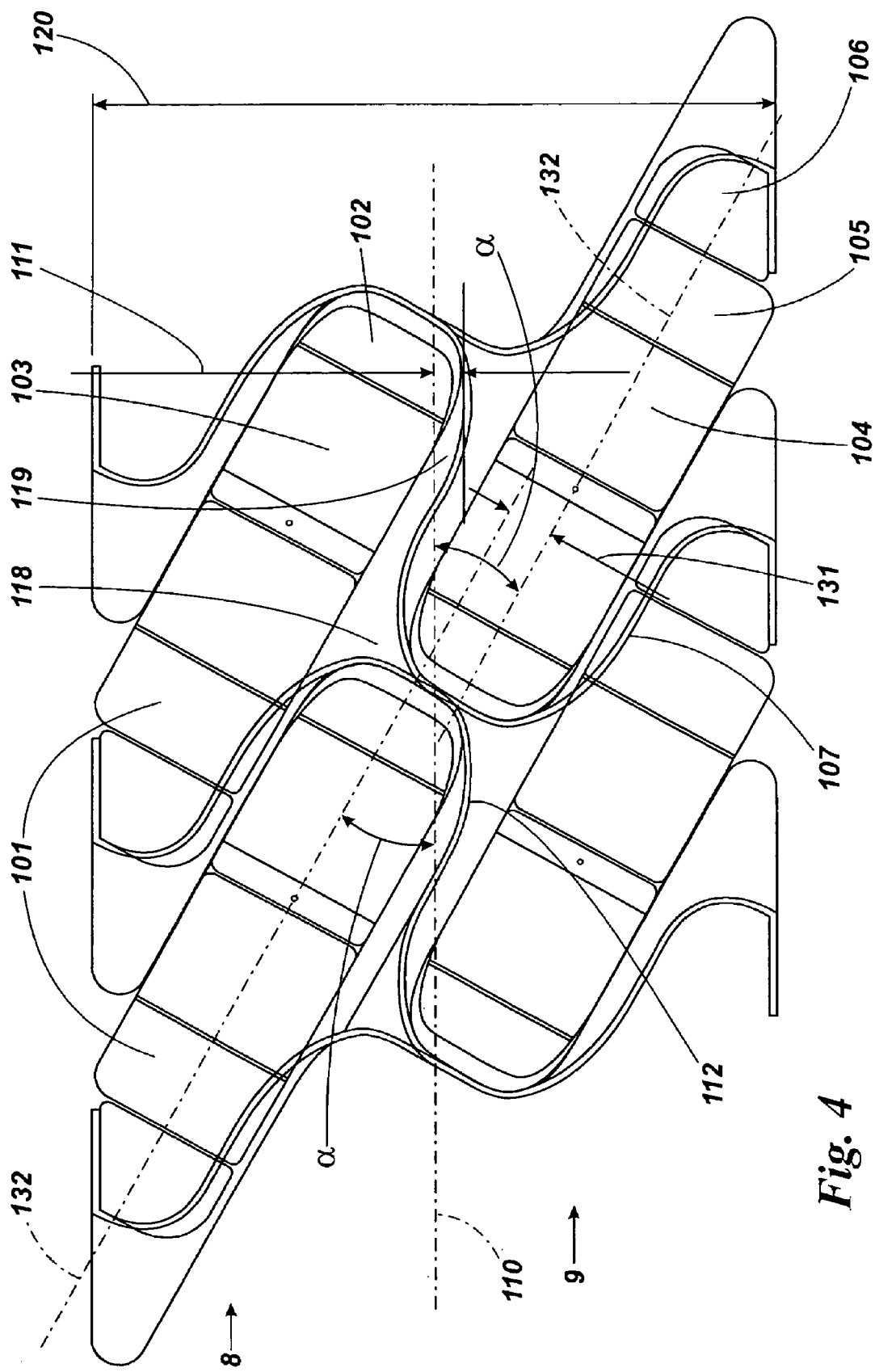
FIG. 4 is a plan view of a short array of four sleepers seats arrayed in second embodiment in accordance with the invention.

Turning now to FIGS. 4 & 5, again the sleeper seats 101 are shown there in sleeping mode. Each comprises a head rest 102, a back rest 103, a seat pan or seat cushion 104, an ottoman 105, a foot rest 106 and a divider 107 analogous to those of the first embodiment. Again the seats are arranged on both sides of the longitudinal axis 110 in two columns 108, 109. However, they are all parallel to each other as opposed to being arranged in chevron formation. The central axes A of all the seats in both columns make with the longitudinal axis substantially the same angle α measured in the clockwise (or anti-clockwise) direction.

Again, each seat extends from its column side of the longitudinal axis across the axis to a small extent 111. Along the axis, first a seat from one column crosses the axis and then a seat from the other column crosses the axis and so on. The seats on opposite sides of the axis are screened from each other by a serpentine divider 112, again integrated with the inter-seat dividers.

The seats on opposite sides of the serpentine dividers are arranged head to head, but with a slight offset 131 in their own longitudinal axes 132.

In addition to the seats extending to the small extent 111 across the longitudinal axis, so do bed side areas 118 at end 119.

Typically for an array angle α of 29° and an array width 120 of 83.5 inches (2121 mm), the extent of the overlap is 4.6 inches (117 mm) in the widthwise direction, i.e. 5.5% of the array width.

Figure 5:
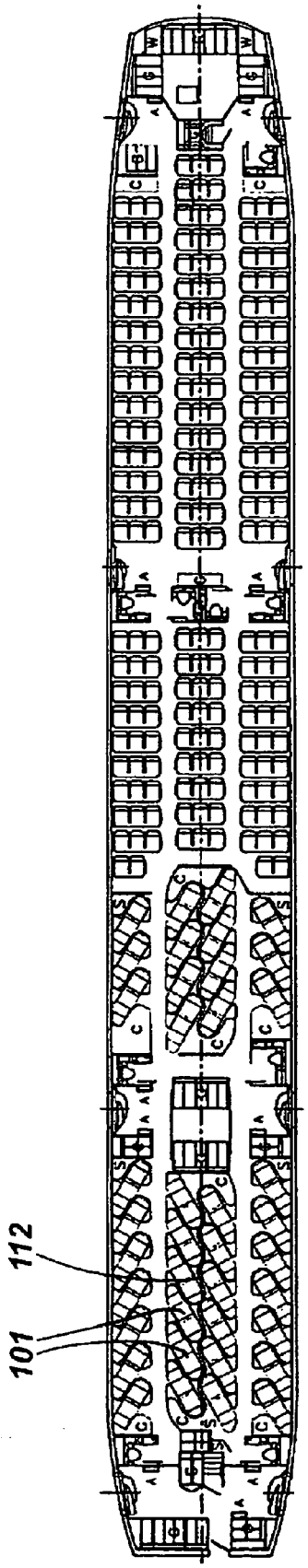
FIG. 5 is a LOPA view of the seats of FIG. 1 in another aircraft cabin.
Figure 6:
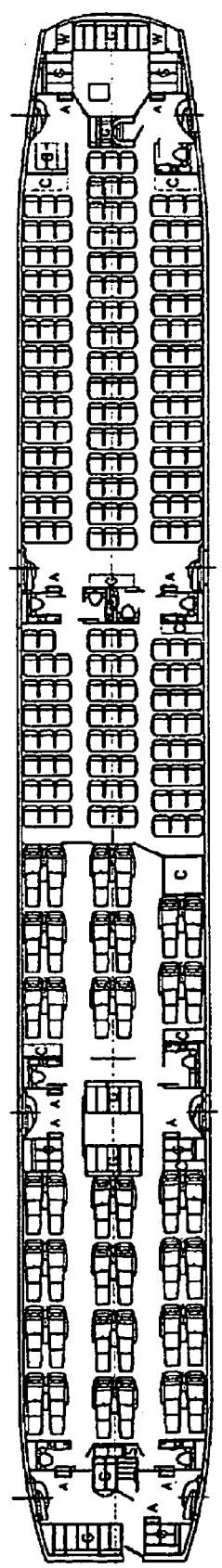
FIG. 6 is an equivalent LOPA to that of FIG. 5 showing a cabin equipped with conventional seats.

Turning now to FIG. 5, which is a two passenger class LOPA, by comparison with FIG. 6 with an equivalent conventional in line business class cabin, the array in accordance with this embodiment of the invention, again allows an increase in the total number of passengers accommodated.

I claim:

1. An array of aircraft seats comprising:
   two columns of seats arranged for array along an aircraft cabin on respective sides of a longitudinal axis of the array;
   the seats having respective central axes,
   the seats in each column having their central axes angled with respect to the longitudinal axis,
   the seats in one column being offset along the longitudinal axis with respect to the corresponding seats in the other column, whereby the intersections with the longitudinal axis of the central axes of the seats of one column are interdigitated with the intersections with the longitudinal axis of the central axes of the seats of the other column and
   minor, overlapping, inner-end portions of any two seats arranged for-and-aft of each other in one column extending across the longitudinal axis from their major portions at their intersections and an intervening seat in the other column having a minor, overlapping, inner-end portion extending oppositely across the longitudinal axis from its major portion at its intersection;
   dividers between the seats within the columns; and a serpentine divider comprised of successive longitudinal axis portions of the dividers between the seats, the serpentine divider extending generally along the longitudinal axis between the seats of the two columns, following the extent of the minor overlapping portions across the longitudinal axis.

2. An array of aircraft seats according to claim 1, wherein the minor, overlapping, inner-end portions of the two columns overlap the longitudinal axis by equal extents.

3. An array of aircraft seats according to claim 1, wherein the extent of the overlap of the minor, overlapping, inner-end portions is between 3% and 6% of the overall width of the array.

4. An array of aircraft seats according to claim 1, wherein all the seats are arranged with their central axes at substantially the same angle with respect to the longitudinal axis.

5. An array of aircraft seats according to claim 4, wherein the seats are arranged in a staggered chevron array, that is with the seats in one column angled with respect to the seats in the other column, and with the central axes of all the seats in one column making with the longitudinal axis substantially the same angle measured in the clockwise or anti-clockwise direction as the central axes of all the seats in the other column make with the longitudinal axis measured in the anti-clockwise or clockwise direction.

6. An array of aircraft seats according to claim 5, wherein the seats are all arranged to face outwards from the longitudinal axis, the inner-ends of the seats being head ends thereof.

7. An array of aircraft seats according to claim 6, wherein the seats are all arranged to face forwards of the aircraft cabin in which they are to be arrayed.

8. An array of aircraft seats according to claim 5, wherein the seats are all arranged to face in towards the longitudinal axis, the inner-ends of the seats being foot ends thereof.

9. An array of aircraft seats according to claim 4, wherein the seats in one column are arranged substantially parallel with the seats in the other column, that is with the central axes of all the seats in both columns making with the longitudinal axis substantially the same angle measured in the clockwise or anti-clockwise direction.

10. An array of aircraft seats according to claim 9, wherein each seat in one column is aligned with an opposite facing seat in the other column, i.e. their central axes are coincident.

11. An array of aircraft seats according to claim 9, wherein each seat in one column is offset from an opposite facing seat in the other column, i.e. their central axes are offset from each other.

12. An array of aircraft seats according to claim 1, including at least one further column of seats spaced by an aisle from the neighbouring one of the two columns of seats:
the seats of the further column having respective central axes; and
the seats in the further column having their central axes angled with respect to the longitudinal axis.

13. An array of aircraft seats according to claim 12, wherein the seats of the or each further column are outwards and forwards facing.

14. An array of aircraft seats according to claim 1, wherein the seats are sleeper seats.

* * * * *